United States Patent
Kil et al.

(10) Patent No.: US 9,408,160 B2
(45) Date of Patent: Aug. 2, 2016

(54) DEVICE AND METHOD FOR RESTRICTING TRANSMISSION OUTPUT IN A PORTABLE TERMINAL

(75) Inventors: Kwang-Min Kil, Gyeonggi-do (KR); Hae-Jun An, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 195 days.

(21) Appl. No.: 13/547,290

(22) Filed: Jul. 12, 2012

(65) Prior Publication Data

US 2013/0016621 A1 Jan. 17, 2013

(30) Foreign Application Priority Data

Jul. 13, 2011 (KR) .................. 10-2011-0069652

(51) Int. Cl.
*H04W 52/24* (2009.01)
*H04B 17/10* (2015.01)
*H04B 17/12* (2015.01)

(52) U.S. Cl.
CPC ........... *H04W 52/246* (2013.01); *H04B 17/103* (2015.01); *H04B 17/12* (2015.01)

(58) Field of Classification Search
CPC ........... H03G 3/3042; H04W 28/0221; H04W 52/00; H04W 52/0209
See application file for complete search history.

(56) References Cited

U.S. PATENT DOCUMENTS

| | | | |
|---|---|---|---|
| 2009/0143028 A1 | 6/2009 | Kim | |
| 2011/0043956 A1* | 2/2011 | Su et al. | 361/86 |
| 2011/0298539 A1* | 12/2011 | Drogi et al. | 330/129 |
| 2012/0190398 A1* | 7/2012 | Leukkunen | 455/522 |

* cited by examiner

*Primary Examiner* — Huy D Vu
*Assistant Examiner* — Teisha D Hall
(74) *Attorney, Agent, or Firm* — Cha & Reiter, LLC.

(57) ABSTRACT

A transmission output restricting method and apparatus of a portable terminal includes a radio frequency (RF) unit to detect a transmission power reflected based on a degree of mismatching of an antenna when a transmission power is emitted via the antenna, and to measure a transmission power increased due to the reflected transmission power caused by a human contact to the antenna, and a controller to control an output of the transmission power by restricting the output of the transmission power when the transmission power measured by the RF unit is greater than or equal to a predetermined value.

10 Claims, 1 Drawing Sheet

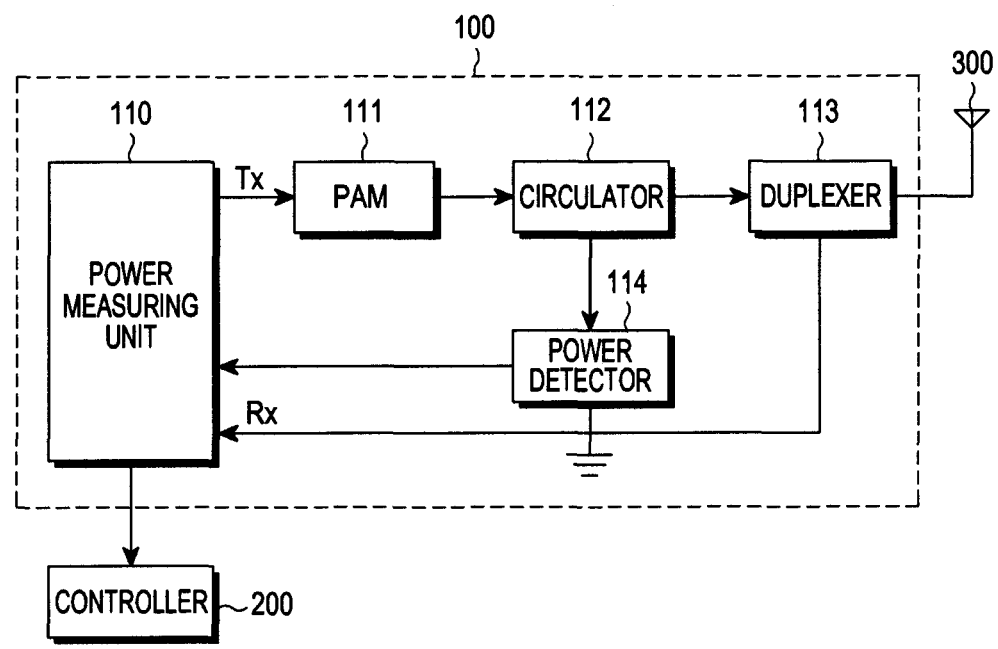

DEVICE AND METHOD FOR RESTRICTING TRANSMISSION OUTPUT IN A PORTABLE TERMINAL

CLAIM OF PRIORITY

This application claims the priority under 35 U.S.C. §119 (a) of an application entitled "Device And Method For Restricting Transmission Output In Potable Terminal" filed in the Korean Intellectual Property Office on Jul. 13, 2011 and assigned Serial No. 10-2011-0069652, the contents of which are hereby incorporated by reference.

BACKGROUND OF THE INVENTION

1. Field of the Invention

The present invention relates to restricting a transmission output of a portable terminal, and more particularly, to a transmission output restricting scheme to restrict a transmission output only through detection by an antenna when the antenna is in contact with a human body.

2. Description of the Related Art

When an antenna of a portable terminal is in contact with a human body, a transmission output may be restricted so as to minimize an adverse health effect on the human body.

As a scheme of restricting the transmission output, a separate touch sensor is included adjacent to the antenna to determine whether the antenna is in contact with the human body is determined.

However, to include the separate touch sensor adjacent to the antenna, a separate touch sensor-dedicated antenna and a circuit for the antenna are required. Further, as the touch sensor-dedicated antenna is contained to be close to a main antenna, performance may be deteriorated. Conversely, if the touch sensor-dedicated antenna is contained to be distant from the main antenna, a scope and a range where a touch sensor function covers may be limited.

SUMMARY OF THE INVENTION

Accordingly, an aspect of the present invention is to solve the above-mentioned problems occurring in the prior art, and to provide a transmission output restricting method and apparatus of a portable terminal, which restricts a transmission output only through detection by an antenna when the antenna is in contact with a human body.

In accordance with an aspect of the present invention, a transmission output restricting apparatus of a portable terminal includes a radio frequency (RF) unit to detect a transmission power reflected based on a degree of mismatching of an antenna when a transmission power is emitted via the antenna, and to measure a transmission power increased due to the reflected transmission power, and a controller to control an output of the transmission power by restricting the transmission power when the transmission power measured by the RF unit is greater than or equal to a predetermined value.

In accordance with another aspect of the present invention, a transmission output restricting method for a portable terminal includes a transmission power based on a reflected transmission power when the transmission power is emitted via the antenna and the reflected transmission power is detected, the reflected transmission power being reflected based on a degree of mismatching of an antenna, and restricting the transmission power when the increased transmission power is greater than or equal to a predetermined value, and outputting the restricted transmission power.

Exemplary embodiments may provide a transmission output restricting method and apparatus of a portable terminal, which may detect a contact between an antenna and a human body only through detection by the antenna of the portable terminal, so as to restrict a transmission power.

BRIEF DESCRIPTION OF THE DRAWINGS

The above and other aspects, features and advantages of the present invention will be more apparent from the following detailed description taken in conjunction with the accompanying drawings, in which:

FIG. 1 is a diagram illustrating a configuration of a transmission output restricting apparatus of a portable terminal according to an exemplary embodiment of the present invention.

DETAILED DESCRIPTION OF EMBODIMENTS

Hereinafter, exemplary embodiments of the present invention will be described with reference to the accompanying drawings. In the following description, the same elements will be designated by the same reference numerals although they are shown in different drawings.

FIG. 1 illustrates a configuration of a transmission output restricting apparatus of a portable terminal according to an exemplary embodiment of the present invention.

It should be noted that the teachings of the present invention described herein used with an exemplary portable mobile terminal. However, one of ordinary skill in the art will recognize that the embodiments of the present invention may also be utilized with other digital equipment, such as a PDA, a tab, a hand-held notebook computer, or any duplex system capable of communicating voice and data.

Referring to FIG. 1, a radio frequency (RF) unit 100 may perform a radio communication function of the portable terminal. The RF unit 100 may include an RF transmitter to perform up-conversion and amplification of a frequency of a transmitted signal, an RF receiver to perform low noise amplification of a received signal and low-conversion of a frequency, and the like. The RF 100 further includes a controller 200 and an antenna 300.

The RF unit 100 may include a power measuring unit 110, a pulse amplitude modulator (PAM) 111, a circulator 112, a duplexer 113, and a power detector 114.

In operation, the power measuring unit 110 may measure a transmission power and a reception power, and may transmit a measured value of the respective power to a controller 200.

The PAM 111 may amplify a received transmission power, and may transmit the amplified transmission power to the circulator 112.

The circulator 112 may transmit, to the duplexer 113, the received transmission power that is amplified by the PAM 111. The circulator 112 may transmit, to the power detector 114, a reflected transmission power that flows backward from the duplexer 113. The circulator 112 may prevent the reflected transmission power from being transferred to the PAM 111, and may send the reflected transmission power to a ground and thus, the circulator 112 may be utilized for preventing a loss of the PAM 111.

The duplexer 113 may emit the transmission power received from the circulator 112 via an antenna 300, and may transmit the reflected transmission power received from the antenna 300 to the circulator 112. Also, the duplexer 113 may transmit, to the power measuring unit 110, a reception power received from the antenna 300.

The power detector 114 may detect the reflected transmission power received from the circulator 112, and may transmit the reflected transmission power to the power measuring unit 110.

The controller 200 may control a general operation of the portable terminal.

The controller 200 may receive a measured value associated with the transmission power from the power measuring unit 110 of the RF unit 100, and the controller 200 may restrict an output of the transmission power when the measured value is greater than or equal to a predetermined value. That is, the controller 200 compares the transmission power measured in the RF unit with a predetermined value of a standard value for detecting that the antenna is in contact with a human body, and if the transmission power measured in the RF unit is higher than the predetermined value, the controller 200 restricts the transmission power to have lower value than the predetermined value. In the embodiment, the power measuring unit performs measuring the transmission/reception power and transmitting the measured value to the control unit, and the control unit performs comparing the transmission power received from the power measuring unit with the predetermined value and outputting the maintained or restricted transmission power according to the comparison result.

Also, when the measured value is less than the predetermined value, the controller 200 may maintain the output of the transmission power.

The antenna 300 may be designed so that matching of the antenna 300 occurs under a free space condition, and the antenna 300 has a maximum efficiency. Accordingly, when a human body is close or in contact with the antenna 300, mismatching may occur and thus, the efficiency may be deteriorated. Power may be reflected to the RF unit 100 based on a degree of mismatching, and the reflected power may flow backward to the RF unit 100 and thus, the power of the RF unit 100 may be increased.

Referring to an operation of restricting a transmission output in the transmission output restricting apparatus of the portable terminal, a transmission power may be amplified by the PAM 111, and the amplified power may be transmitted through the circulator 112 and the duplexer 113, and may be emitted via the antenna 300.

In this example, when a human body is close to the antenna 300, mismatching of the antenna 300 may occur and thus, the efficiency may be deteriorated and the transmission power is reflected to the RF unit 100 based on a degree of mismatching.

The transmission power reflected based on the degree of mismatching may be transmitted, to the power detector 114, through the duplexer 113 and the circulator 112. The power detector 114 may detect the reflected transmission power, and may transmit the reflected transmission power to the power measuring unit 110.

The power measuring unit 110 may measure a transmission power increased due to the reflected transmission power, and may transmit a measured value to the controller 200.

The controller 200 may maintain an output of the transmission power when the measured value received from the power measuring unit 110 is less than a predetermined value, and may restrict the output of the transmission power when the measured value received from the power measuring unit 110 is greater than or equal to the predetermined value.

As described in the foregoing, a transmission power may be reflected based on a degree of mismatching when a human body is close to an antenna. In this example, when a value of a transmission power increased due to the reflected transmission power is greater than or equal to a predetermined value, the transmission output restricting apparatus of the portable terminal may detect that the human body is close to the antenna, and may restrict an output of the transmission power so as to minimize an adverse health effect on the human body.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for restricting a transmission output of a portable terminal, comprising:
    a radio frequency (RF) unit to detect a transmission power reflected based on a degree of mismatching of an antenna and to measure a transmission power including the reflected transmission power; and
    a controller to restrict the transmission power to have lower value than a predetermined value when the transmission power including the reflected transmission power measured by the RF unit is greater than or equal to the predetermined value,
    wherein detecting the reflected transmission power, executing the transmission output at the restricted transmission power, and executing a normal operation of the transmission output are performed by the same antenna,
    wherein the RF unit comprises: a circulator to transmit the reflected transmission power, a power detector to detect the reflected transmission power from the circulator, and a power measuring unit to measure the transmission power including the reflected transmission power received from the power detector, and
    wherein the circulator is disposed between a duplexer and a pulse amplitude modulator (PAM), so as to prevent the reflected transmission power received through the duplexer from being transmitted back to the PAM.

2. The apparatus of claim 1, wherein the mismatching occurs when an object is close or in contact with the antenna.

3. The apparatus of claim 1, wherein the controller maintains the output of the transmission power to be maintained when the transmission power including the reflected transmission power measured by the power detector is less than or equal to the predetermined value.

4. A method of restricting a transmission output of a portable terminal, the method comprising:

detecting a transmission power reflected based on a degree of mismatching of an antenna;

detecting an transmission power including the reflected transmission power; and restricting the transmission power to have lower value than a predetermined value when the transmission power including the reflected transmission power is greater than or equal to the predetermined value, wherein detecting the reflected transmission power, executing the transmission output at the restricted transmission power, and executing a normal operation of the transmission output are performed by the same antenna, wherein the portable terminal further comprises a RF unit including: a circulator to transmit the reflected transmission power, a power detector to detect the reflected transmission power from the circulator, and a power measuring unit to measure the transmission power including the reflected transmission power received from the power detector, and wherein the circulator is disposed between a duplexer and a pulse amplitude modulator (PAM), so as to prevent the reflected transmission power received through the duplexer from being transmitted back to the PAM.

5. The method of claim 4, wherein and the mismatching occurs when an object is close or in contact with the antenna.

6. The method of claim 4, further comprising:

maintaining an output of the transmission power when the transmission power including the reflected transmission power is less than the predetermined value.

7. A portable terminal having an antenna, comprising:

a radio frequency (RF) unit to detect a transmission power reflected based on a degree of mismatching of the antenna and to measure an transmission power including the reflected transmission power; and a controller to restrict an output of the transmission power when the transmission power including the reflected transmission power measured by the RF unit is greater than or equal to a predetermined value, wherein detecting the reflected transmission power, executing the output at the restricted transmission power, and executing a normal operation of the transmission output are performed by the same antenna, wherein the RF unit comprises: a circulator to transmit the reflected transmission power, a power detector to detect the reflected transmission power from the circulator, and a power measuring unit to measure the transmission power including the reflected transmission power received from the power detector, and wherein the circulator is disposed between a duplexer and a pulse amplitude modulator (PAM), so as to prevent the reflected transmission power received through the duplexer from being transmitted back to the PAM.

8. The portable terminal of claim 7, wherein the controller restricts the output of the transmission output by a predetermined amount when the transmission power including the reflected transmission power measured by the RF unit is greater than or equal to the predetermined value.

9. The portable terminal of claim 7, wherein the mismatching occurs when an object is close or in contact with the antenna.

10. The portable terminal of claim 7, wherein the controller controls the output of the transmission power to be maintained when the transmission power including the reflected transmission power measured by the power detector is less than or equal to the predetermined value.

* * * * *